United States Patent
Ritchie et al.

(10) Patent No.: US 11,811,051 B2
(45) Date of Patent: *Nov. 7, 2023

(54) ELECTROCHEMICAL CELL DESIGN WITH LITHIUM METAL ANODE

(71) Applicant: Apple Inc., Cupertino, CA (US)

(72) Inventors: Alan A. Ritchie, Menlo Park, CA (US); Karl M. Brown, Los Gatos, CA (US); Lin Ma, Sunnyvale, CA (US); Korhan Demirkan, Santa Clara, CA (US); Andrew Basile, Santa Clara, CA (US); Richard M. Mank, Cupertino, CA (US); Bernd Jurgen Neudecker, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/028,278

(22) Filed: Sep. 22, 2020

(65) Prior Publication Data

US 2022/0093908 A1    Mar. 24, 2022

(51) Int. Cl.
*H01M 4/134* (2010.01)
*H01M 4/38* (2006.01)
(Continued)

(52) U.S. Cl.
CPC ........... *H01M 4/134* (2013.01); *H01M 4/366* (2013.01); *H01M 4/382* (2013.01); *H01M 4/405* (2013.01);
(Continued)

(58) Field of Classification Search
None
See application file for complete search history.

(56) References Cited

U.S. PATENT DOCUMENTS

| 2005/0042515 A1* | 2/2005 | Hwang | H01M 10/0565 429/231.95 |
| 2018/0294476 A1* | 10/2018 | Zhamu | H01M 10/0565 |
| 2018/0301707 A1 | 10/2018 | Pan et al. | |

FOREIGN PATENT DOCUMENTS

| WO | 0139303 A1 | 5/2001 |
| WO | 2014176266 A1 | 10/2014 |

OTHER PUBLICATIONS

Liang, X., et. al., "A facile surface chemistry route to a stabilized lithium metal anode", Nature Energy, Jul. 31, 2017, vol. 2, Article No. 17119, www.nature.com/articles/nenergy2017119 (7 pp).

(Continued)

*Primary Examiner* — Laura Weiner
(74) *Attorney, Agent, or Firm* — Young Basile Hanlon & MacFarlane, P.C.

(57) ABSTRACT

An electrochemical cell has a cathode having a cathode current collector and a cathode active material, an anode having an anode current collector, lithium metal seed, and an anode cap on the lithium metal seed, a liquid electrolyte, a separator between the cathode active material and the anode active material, and a polymer electrolyte lamination layer bonding the anode to the separator. The polymer electrolyte lamination layer is formulated using a crosslinked polymer, a lithium salt, a plasticizer, and an anode additive. The anode cap and the polymer electrolyte lamination layer work together to produce densely plated lithium metal between the lithium metal seed and the anode cap with little or no external pressure.

8 Claims, 5 Drawing Sheets

(51) Int. Cl.

| | |
|---|---|
| *H01M 4/40* | (2006.01) |
| *H01M 10/052* | (2010.01) |
| *H01M 10/0565* | (2010.01) |
| *H01M 10/0568* | (2010.01) |
| *H01M 4/36* | (2006.01) |
| *H01M 50/414* | (2021.01) |
| *H01M 50/46* | (2021.01) |
| *H01M 50/449* | (2021.01) |
| *H01M 4/02* | (2006.01) |

(52) U.S. Cl.
CPC ..... *H01M 10/052* (2013.01); *H01M 10/0565* (2013.01); *H01M 10/0568* (2013.01); *H01M 50/414* (2021.01); *H01M 50/449* (2021.01); *H01M 50/46* (2021.01); *H01M 2004/027* (2013.01); *H01M 2300/0082* (2013.01); *H01M 2300/0094* (2013.01)

(56) References Cited

OTHER PUBLICATIONS

International Search Report and Written Opinion dated Feb. 28, 2022, in International Application No. PCT/US2021/071028 (17 pp).
Lin, D., et. al., "Reviving the lithium metal anode for high-energy batteries", Nature Nanotechnology, Review Article, Published online Mar. 7, 2017 www.nature.com/naturenanotechnology (13 pp).
Li, M., et. al., "New Concepts in Electrolytes", Chemical Reviews, https://dx.doi.org/10.1021/acs.chemrev.9b00531, Special Issue: Beyond Li Battery Chemistry, Received: Aug. 28, 2019 (37 pp).
Zhou, H., et. al., "Protective coatings for lithium metal anodes: Recent progress and future perspectives", Journal of Power Sources, https://doi.org/10.1016/j.jpowsour.2019.227632 , (18 pp).
Zhou, W., et. al., "Plating a Dendrite-Free Lithium Anode with a Polymer/Ceramic/Polymer Sandwich Electrolyte", Journal of the American Chemical Society, pubs.acs.org/JACS, (11 pp).

\* cited by examiner

ELECTROCHEMICAL CELL DESIGN WITH LITHIUM METAL ANODE

TECHNICAL FIELD

This disclosure relates to an electrochemical cell design with high energy density, replacing a graphite anode in a lithium-ion cell with a thinner and lighter lithium metal anode.

BACKGROUND

Lithium metal batteries have received significant attention as advanced high-performance next generation batteries. The Lithium metal battery is attractive due to its high volumetric and gravimetric energy densities. However, the lithium metal anode is not compatible with the commonly used liquid electrolytes in lithium-ion cells, causing large irreversible anode volume increases of insufficient electrochemical reversibility, resulting in low energy density and low cycle life, respectively. Modifying the composition of the liquid electrolyte may not lead to a viable cell design, as the lithium metal anode still reacts with the liquid electrolyte and develops non-uniform and fluffy lithium plating. The direct contact between the liquid electrolyte and the lithium metal anode leads to continuous reaction at the lithium metal interface, which consumes the liquid electrolyte and forms an unfavorable solid electrolyte interface (SEI) layer. Loose contact between the lithium metal anode and the separator allows the fluffy lithium dendrites to grow into the liquid electrolyte space. Other factors, such as non-uniform current distribution at the lithium metal interface, particularly at high current rates, attribute to non-uniform and fluffy lithium plating. The resulting structural instability limits the applications of these batteries. Applying external pressure in an attempt to limit the thickness growth of the lithium metal anode does not eliminate the dendritic, fluffy morphology and is unfavorable or infeasible in many practical applications.

SUMMARY

Disclosed herein are implementations of an electrochemical cell design with high energy density and a thinner and lighter lithium metal anode. The electrochemical cells disclosed herein have high volumetric and gravimetric energy densities for a given capacity per area under low or no external pressure. The electrochemical cells of high energy density disclosed herein replace the conventional graphite anode in a lithium-ion cell with a thinner and lighter lithium metal anode per unit of capacity/area, the lithium metal anode remaining thinner and lighter from cell fabrication through the end of the electrochemical cell's life.

An electrochemical cell disclosed herein comprises a cathode having a cathode current collector and a cathode active material; an anode having an anode current collector, lithium metal on the anode current collector and an anode cap formed of a lithium alloy on the lithium metal opposite the anode current collector; a separator between the cathode active material and the anode cap; liquid electrolyte; and a polymer electrolyte lamination layer bonding the anode to the separator. The polymer electrolyte lamination layer comprises a crosslinked polymer, a lithium salt, a plasticizer, and an anode additive. The polymer electrolyte lamination layer prevents the liquid electrolyte from contacting the anode.

Another electrochemical cell as disclosed herein comprises a cathode having a cathode current collector and a cathode active material; an anode having an anode current collector, a lithium metal seed layer, and an anode cap on the lithium metal seed layer, the anode cap consisting of $Li_xM$, wherein M is one or more metal element; a separator between the cathode active material and the anode; a polymer electrolyte lamination layer bonding the anode to the separator; and liquid electrolyte between the cathode current collector and the polymer electrolyte lamination layer. The polymer electrolyte lamination layer comprises a crosslinked polymer backbone having a molecular weight of between 400,000 g/mol and 900,000 g/mol, a lithium salt at a concentration of 3M or greater, a plasticizer, and an anode additive. An external pressure on the electrochemical cell is 20 psi or less.

Also disclosed is a lithium metal battery comprising one or more electrochemical cells as disclosed herein, wherein an external pressure on the lithium metal battery is 20 psi or less. The lithium metal battery can have a volumetric energy density of greater than 1000 Wh/L.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
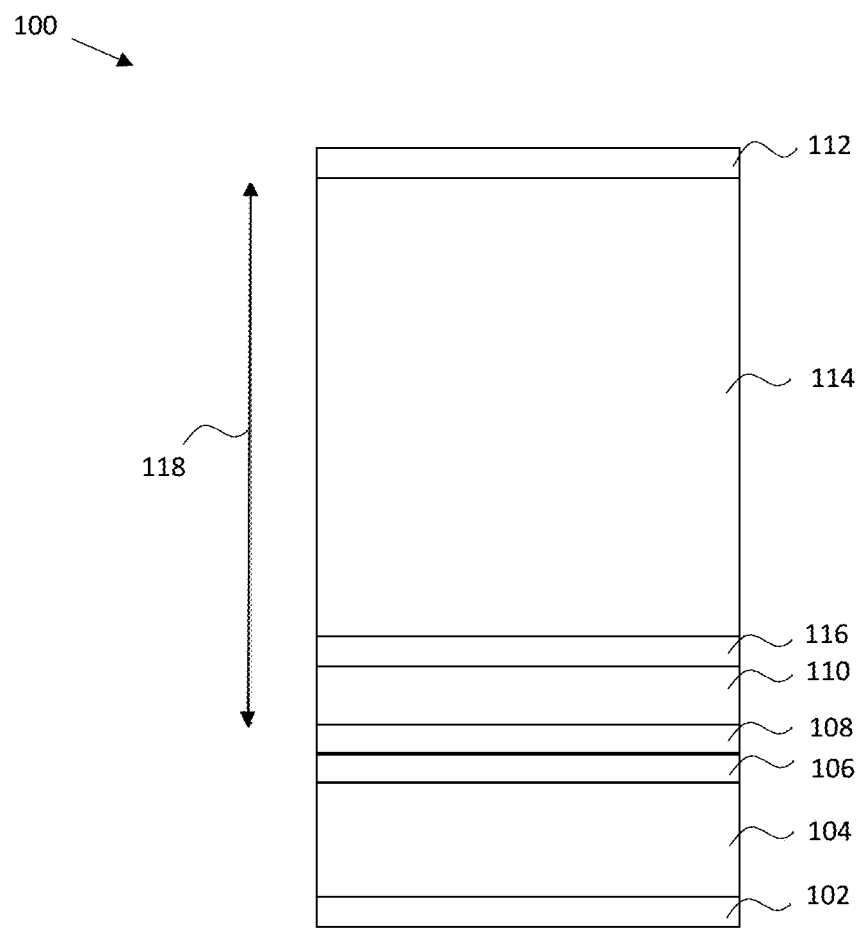
FIG. 1 is a schematic of an electrochemical cell design as disclosed herein, prior to cycling and after discharge.

Although lithium metal batteries are attractive due to their high volumetric and gravimetric energy densities, the lithium metal anode is not compatible with conventional liquid electrolytes used in the lithium ion cell. This incompatibility results in non-uniform lithium plating and fluffy lithium plating, causing performance issues that can limit the applications of these batteries. The non-uniform and fluffy lithium plating can be caused, in part, by 1) contact between the liquid electrolyte and the lithium metal anode, which leads to continuous reaction at the lithium metal interface, consuming the liquid electrolyte and forming an unfavorable SEI layer; 2) loose contact between the lithium metal anode and the separator, which allows the fluffy lithium dendrites to grow into the liquid electrolyte space; and 3) non-uniform current distribution at the lithium metal interface. The non-uniform and fluffy lithium plating cause the swelling of the anode, which lowers the volumetric energy density of the cell. External applied pressure to the cell may be helpful for denser lithium plating, but has not been shown to eliminate the dendritic, fluffy morphology. Furthermore, external pressure is unfavorable or infeasible in many practical applications. An external pressure fixture is undesirable as it requires extra volume and weight around a cell. Such design offsets the energy density gains the cell design with a lithium metal anode, rather than a graphite anode, is providing. This situation adversely impacts smaller, often volume sensitive consumer electronic devices more than larger batteries, such as those used in electric vehicles. The larger batteries might, to some extent, tolerate a common, light pressure fixture for an entire array of multiple cells in which the weight addition formally allocated to each cell remains limited. However, as noted, external pressure has not solved the dendritic, fluffy lithium morphology and its resulting performance degradation.

To address these issues, disclosed herein is an electrochemical cell with high volumetric and gravimetric energy density for a given capacity per area, using a lithium metal anode instead of the conventional thicker and heavier graphite anode, under low or no external pressure. The electrochemical cells of high energy density disclosed herein replace the conventional graphite anode in a lithium-ion cell with a thinner and lighter lithium metal anode per unit of capacity/area, the lithium metal anode remaining thinner and lighter from cell fabrication through the end of the electrochemical cell's life. Volumetric energy density of the electrochemical cells disclosed herein, excluding packaging, is higher than 1000 Wh/L, while the gravimetric energy density of the electrochemical cells disclosed herein, excluding packaging, is higher than 400 Wh/kg.

High volumetric energy density is measured in terms of energy delivered at the beginning of the electrochemical cell's life (e.g., cycle #1) at C/5 discharge current rate divided by the volume of the electrochemical cell at full charge at the electrochemical cell's end of life, which includes the plated lithium metal thickness and any irreversible thickness increases within the electrochemical cell component layers. The importance of volumetric energy density is based on the fact that the electronic device into which an electrochemical cell is integrated should leave space for the maximum material condition (MMC) of the electrochemical cell in a battery, which is at least as large as the charged volume of the packaged electrochemical cells at the end of life.

The electrochemical cells disclosed herein achieve the high volumetric and gravimetric energy densities with a well bonded stack of layers including an anode current collector, a lithium metal anode, a lithium alloy anode cap, a polymer electrolyte lamination layer and a separator. The specific layer sequence of excess lithium metal, in the form of the lithium metal anode seed and/or lithium metal anode during and after lithium plating, capped with the lithium alloy anode cap and protected from the liquid electrolyte by the polymer electrolyte lamination layer, enables dense and uniform lithium plating between the lithium metal anode bulk and the lithium alloy anode cap, a liquid electrolyte-free, chemically protected environment during cell cycling. The specific layers and the sequence of the layers avoid low density lithium plating into mechanically soft, liquid electrolyte, thereby enabling and retaining high volumetric energy density in conjunction with long cycle life, all without the need for an external pressure fixture.

FIG. 1 is a schematic of an electrochemical cell 100 as disclosed herein with the well bonded stack of layers. The electrochemical cell 100 has an anode current collector 102 and a lithium metal anode 104 disposed on the anode current collector 102. A lithium alloy anode cap 106 is formed on the lithium metal anode 104. A polymer electrolyte lamination layer 108 bonds the lithium alloy anode cap 106 to a separator 110. The electrochemical cell 100 also has a cathode current collector 112 and a cathode active material 114 disposed on the cathode current collector 112. In some aspects, a cathode coating 116 may be formed on the cathode active material 114 between the cathode active material 114 and the separator 110. In some aspects, the cathode coating 116 may be formed on a cathode-facing side of the separator 110. Liquid electrolyte 118 is represented with the arrow. In some aspects, the separator 110 may have an anode coating (not shown) formed on the anode-facing side of the separator 110, so long as the coating does not interfere with the bonding between the separator 110 and the polymer electrolyte lamination layer 108.

The electrochemical cells disclosed herein provide solutions to the problems discussed herein by using 1) a spatially separated, and thus chemically separated, lithium metal anode from the liquid electrolyte via interposing the combination of the lithium alloy anode cap 106 and the polymer electrolyte lamination layer 108, with the lithium alloy anode cap 106 in direct contact with the lithium metal anode 104 and the polymer electrolyte lamination layer 108 in direct contact with the liquid electrolyte 118, as illustrated in FIG. 1; and 2) a well bonded (laminated) anode stack, including the anode current collector 102, the lithium metal anode 104, the lithium alloy anode cap 106, the polymer electrolyte lamination layer 108 and the separator 110, which provides low impedance and uniform, bonded solid state interfaces. These bonded interfaces avoid a liquid electrolyte interface with the lithium metal anode, preventing the uncontrolled growth of low density, high volume, dendritic, fluffy lithium metal morphology into the liquid electrolyte space. The liquid electrolyte 118 in the separator 110 is allowed to interface with the polymer electrolyte lamination layer 108, which in turn serves as a solid-state electrolyte, as no lithium plating can occur at this interface due to the lack of electrons.

Figure 2:
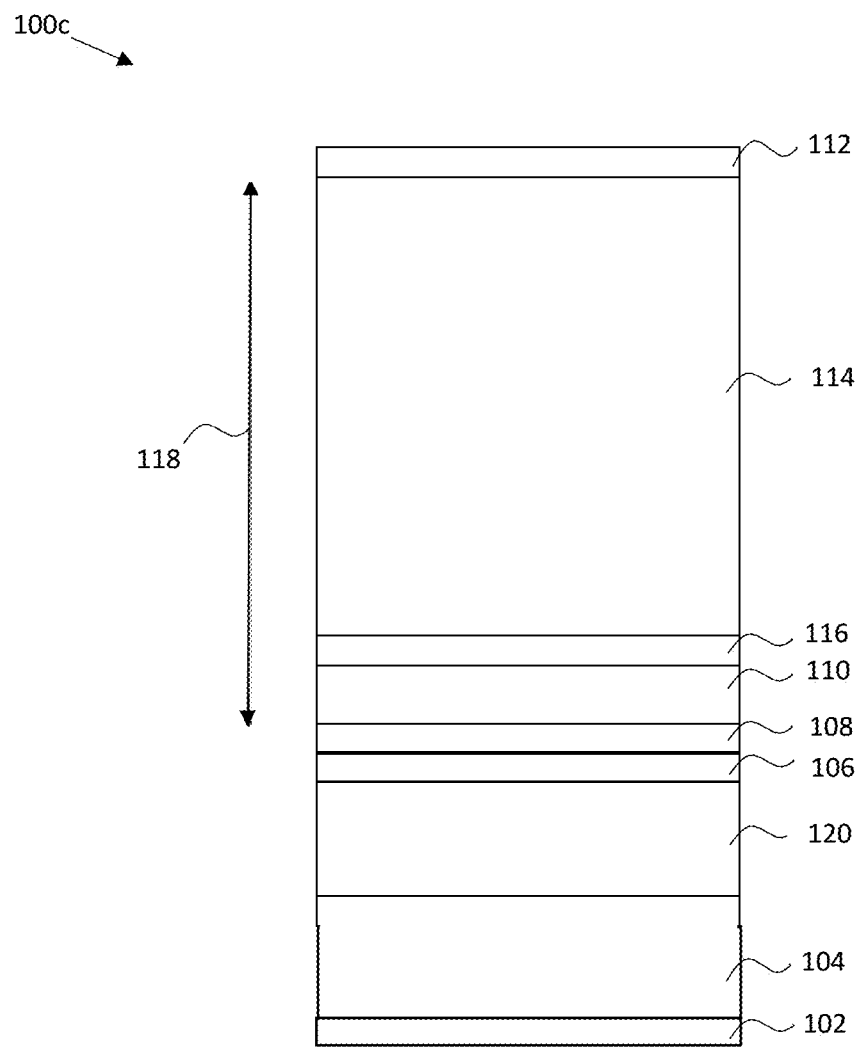
FIG. 2 is a schematic of the electrochemical cell design of FIG. 1 after charging.

FIG. 2 illustrates the electrochemical cell 100 of FIG. 1, with the electrochemical cell 100c in a charged state. FIG. 2 illustrates how the specific layer sequence enables dense and uniform plated lithium 120 only between the lithium metal anode 104 seed and the lithium alloy anode cap 106, in the liquid electrolyte-free, chemically protected environment during cell cycling. After discharge, the electrochemical cell 100 will resemble the electrochemical cell 100 of FIG. 1, with the lithium metal anode 104 reduced back to the seed lithium, the plated lithium 120 having been discharged.

Figure 3:
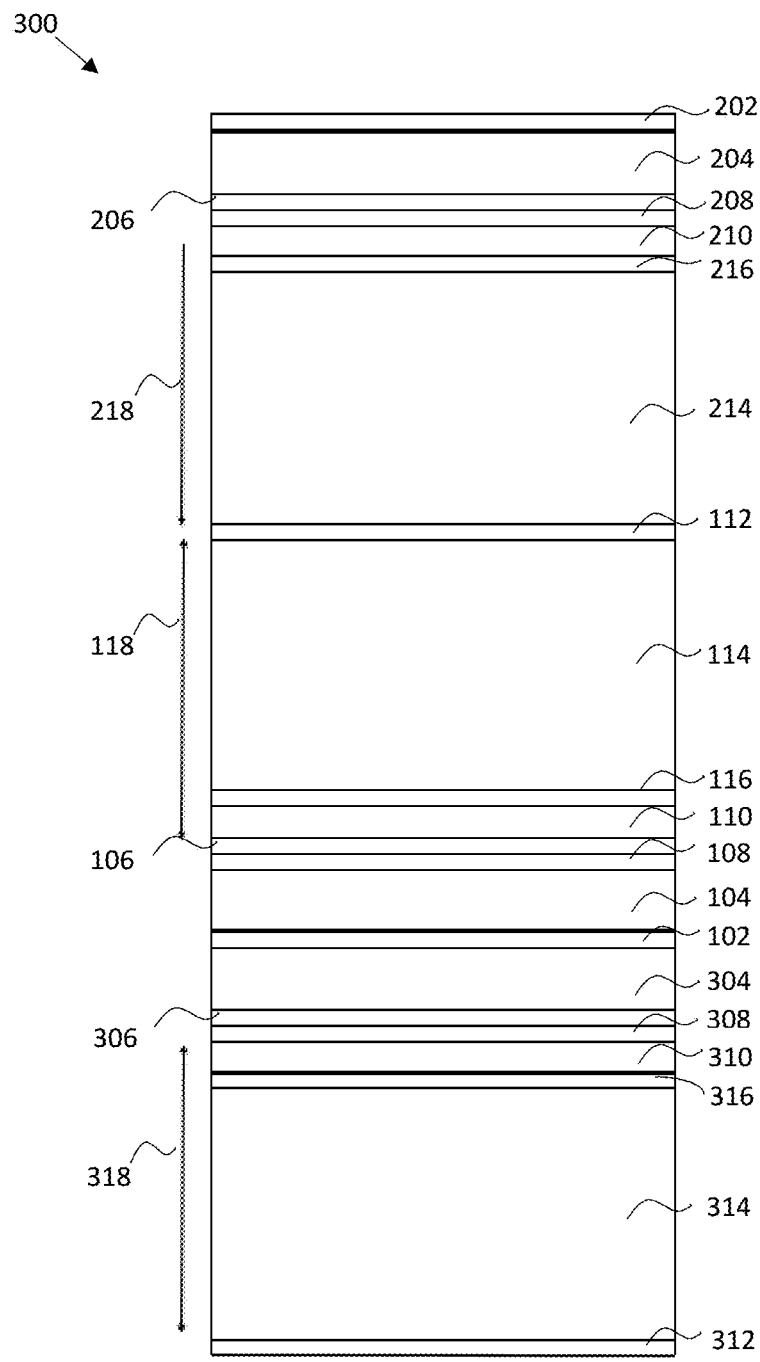
FIG. 3 is a schematic of a multi-cell design as disclosed herein.

FIG. 3 illustrates a multi-cell design in which current collectors between cells are double sided. The design allocates half of the current collector thickness and weight to adjacent unit cells. The cells in FIG. 3 are illustrated pre-charge or discharged, as in the electrochemical cell 100 in FIG. 1. Any multiple of cells can be incorporated. The multi-cell design 300 includes the anode current collector 102, which is a double-sided current collector, with the lithium metal anode 104 disposed on the anode current collector 102. The lithium alloy anode cap 106 is formed on the lithium metal anode 104. The polymer electrolyte lamination layer 108 bonds the lithium alloy anode cap 106 to the separator 110. The cathode current collector 112, which is also a double-sided current collector, has the cathode active material 114 disposed on one side of the cathode current collector 112 between the cathode current collector 112 and the separator 110. In some aspects, the cathode coating 116 may be formed on the cathode active material 114 between the cathode active material 114 and the separator 110 or may be formed on a cathode-facing side of the separator 110. The liquid electrolyte 118 is represented with the arrow.

On the cathode current collector 112 opposite the cathode active material 114 is cathode active material 214 of another unit cell. Layered on the cathode active material 214 is an optional cathode coating 216, a separator 210, a polymer electrolyte lamination layer 208, a lithium alloy anode cap 206, a lithium metal anode 204 and an anode current collector 202. The anode current collector 202 can be double-sided, with another unit cell layered as described. If the unit cell is an exterior cell, the anode current collector 202 will be single-sided.

On the anode current collector 102 opposite the lithium metal anode 104 is lithium metal anode 304 of another unit cell. Layered on the lithium metal anode 304 is a lithium alloy anode cap 306, a polymer electrolyte lamination layer 308, a separator 310, an optional cathode coating 316, a cathode active material 314 and a cathode current collector 312. The cathode current collector 312 can be double-sided, with another unit cell layered as described. If the unit cell is an exterior cell, the cathode current collector 312 will be single-sided.

The cathode current collector 112, 312 can be, for example, an aluminum sheet or foil. Other metal and alloy materials are contemplated. The cathode current collector 112, 312 can have a thickness of 6 µm to 12 µm. Cathode active material 114, 214, 314 can include one or more lithium transition metal oxides which can be bonded together using binders and optionally conductive fillers such as carbon black. The cathode active material can have a thickness of between 1 µm and 500 µm. Lithium transition metal oxides can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xCo_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$. In some embodiments, the cathode active material may be composed of only electrochemically active material, such as sintered LCO.

The separator 110, 210, 310 is a porous, tortuous mechanical layer or membrane that physically separates the cathode active material from the polymer electrolyte lamination layer and other layers of the stack. The separator can be between 0.1 µm and 30 µm in thickness and may be composed of a single layer or multi-layer of organic or inorganic materials, such as polyolefins and glass fibers, respectively. The separator may be coated on one or both sides with organic (e.g., polyvinylidene fluoride (PVdF)) and/or inorganic (e.g., magnesium hydroxide ($Mg(OH)_2$)) materials. The single sided separator coating may preferably be a coating at the cathode side. Alternatively, the separator coating at the cathode side may be provided by a coating on the cathode, rather than a coating on the separator.

The liquid electrolyte 118, 218, 318 is located inside the separator and its coating layers, if present, as well as the cathode active material and is in contact with the polymer electrolyte lamination layer and the cathode current collector while being compatible with all four layers under all operation conditions. The liquid electrolyte can be composed of at least one lithium salt (e.g., lithium bis (fluorosulfonyl) imide (LiFSI)) dissolved in at least one organic solvent (e.g., dimethyl carbonate (DMC)) or inorganic liquid solvent. The liquid electrolyte 214 may contain at least one ionic liquid (e.g., Py13FSI) and may contain organic and inorganic additives (e.g., bis(2,2,2-trifluoroethyl)ether (BTFE), lithium bis(oxalato)borate (LiBOB)).

The lithium metal anode 104, 204, 304 can comprise lithium metal. The lithium metal anode can be, for example, a lithium metal seed on the anode current collector. The lithium metal seed can be between 0.01 µm and 30 µm in thickness. Upon charge, additional lithium metal is plated onto the lithium metal anode seed. The anode current collector 102, 202 can be a copper, nickel or titanium sheet or foil, as a non-limiting example. The anode current collector can be between 4 µm and 8 µm in thickness.

The lithium alloy anode cap can be from 0.01 µm to 10 µm in thickness, and in particular from 0.2 µm to 2.5 µm, and is composed of the maximally lithiated alloy of a given metal M that is capable of forming an inter-metallic compound with lithium. M may comprise of one or more metal elements (ternary, quaternary, quinary, etc.) and may be selected from Sn, Sb, Si, Au, Zn, Al, and Mg, as non-limiting examples. The anode cap may also contain elements which, if binary, would only form solid solutions with lithium, such as Cu, Ti, and Ni.

LiSn is a non-limiting example of a lithium alloy anode cap. A galvanic cell is formed when lithium and tin are in contact, which drives alloy formation to a stable situation at low temperatures. LiSn also diffuses lithium ions very quickly. LiSn has a diffusion coefficient of about $10^{-7}$ $cm^2/s$, while LiPON and $LiCoO_2$ have diffusion coefficients of $10^{-9}$ $cm^2/s$ and $10^{-10}$ $cm^2/s$. Lithium and tin are both active materials. Adding an inactive matrix such as Cu, Ti, Ni, or NiTi can provide further stability as these components will not react or move within the anode cap layer. Non-limiting examples of the lithium alloy anode cap include LiSnCu, LiSnTi, LiSnNi, and LiSnNiTi. These anode cap compositions may be formulated such that, for example, the LiSnCu anode cap may be Cu rich, or the LiSnCu layer may be coated with a Cu skin near the polymer electrolyte lamination layer 108, 208, 308. By the same token, the LiSnNiTi anode cap, for example, may be Ni or Ti rich, or may be coated with a Ni, Ti, or NiTi skin near the polymer electrolyte lamination layer 108, 208, 308.

The lithium alloy anode cap is in contact with an excess amount of lithium metal, in the form of the lithium metal anode seed or lithium metal anode during and after lithium plating, and thus adopts the maximally lithiated alloy possible for M during a given cell's life. Empirically, it was found that upon cell charge the lithium atoms plate densely and uniformly between the lithium alloy anode cap and the existing lithium metal seed at very low impedance while fusing with the latter. This location of lithium plating is desired. A reason that the lithium atoms prefer to plate between the lithium alloy anode cap and the lithium metal anode, rather than the lithium alloy anode cap and the polymer electrolyte lamination layer, is rooted in a thermodynamic voltage gradient which disappears not until the incoming lithium atoms reach the lithium metal anode bulk. Upon discharge, the plated lithium is stripped off uniformly. This can be seen in FIG. 4A, discussed later.

To achieve the results herein, the layer stack of anode current collector, lithium metal anode, lithium alloy anode cap, polymer electrolyte lamination layer, and separator should remain tightly bonded (laminated) at all times. This bond can be achieved, in one embodiment, by forming the lithium alloy anode cap $Li_xM$ from an in-situ reaction layer of, for instance, vacuum deposited M onto the lithium metal anode seed followed by a controlled surface passivation with, for instance, $CO_2$ gas or mixtures thereof or ex-situ dip solutions containing diluted carboxylic acids in hydrocarbon. Then, a polymer electrolyte lamination layer slurry is cast onto the surface passivated lithium alloy anode cap before the separator is laid into the slurry, whose casting solvent is subsequently dried off. The so-created bond strength in the stack is a function of the polymer electrolyte lamination layer composition, including casting solvent, and post-cast drying conditions. Other approaches exist to form the lithium alloy anode cap, such as, for instance, (i) dip coating of the lithium metal anode seed into a solution that contains salt(s) of M with which the lithium metal anode seed reacts to $Li_xM$ or (ii) providing salt(s) of M as additives in the polymer electrolyte lamination layer, wherein the lithium metal anode seed reacts in-situ at its surface to $Li_xM$ when the polymer electrolyte lamination layer slurry is applied onto the lithium metal anode seed.

The polymer electrolyte lamination layer 108, 208, 308 comprises a crosslinked polymer backbone and functional components including lithium salt, a plasticizer and an anode additive. The polymer electrolyte lamination layer disclosed herein reduces the non-uniform and fluffy lithium plating while lowering or eliminating external pressure requirements, resulting in stable cell performance. The polymer electrolyte lamination layer disclosed herein has at least three functions. The polymer electrolyte lamination layer serves to laminate the lithium alloy anode cap, and thus the lithium metal anode, to the separator, providing strong bonding between the layers. The internal pressure provided by the bond onto the lithium metal facilitates dense lithium plating at low or no external pressure. The polymer electrolyte lamination layer acts as a protective layer to block contact between the liquid electrolyte and the lithium metal anode, reducing or preventing the continuous reaction between the electrolyte and the lithium metal. The polymer electrolyte lamination layer serves as an additional electrolyte layer as the polymer electrolyte lamination layer is lithium ion conductive, while promoting uniform lithium distribution and plating at the electrode interface.

The formulations of the polymer electrolyte lamination layer achieve high ionic conductivity while also achieving strong mechanical strength. The crosslinked polymer forming the backbone is used as a polymer electrolyte matrix to enhance the stability with the liquid electrolyte, while the functional components enable the electrolyte functionality of the lamination layer. The strong bonding is achieved by long, flexible polymer chains of the crosslinked polymer. The crosslinking structure helps to maintain the integrity of the polymer layer in the liquid electrolyte, preventing or reducing dissolution of the layer by the aggressive liquid electrolyte. The polymer electrolyte lamination layer provides greater than 20 N/m dry lamination strength and greater than 20 N/m wet lamination strength between the anode and the separator. The cross-linked polymer backbone, with very different solubility parameters than that of the liquid electrolyte solvent, is not dissolved or swollen by the solvent in the liquid electrolyte. The lithium salt and plasticizer are already within the solid region of the crosslinked polymer before seeing the solvent, and bond tightly to the crosslinked polymer chain, preventing the solvent from permeating through the polymer electrolyte lamination layer. The lithium alloy anode cap/polymer electrolyte lamination layer interface remains free of solvent and allows chemical and electrochemical stability. The plasticizer assists in the ionic conduction, the high lithium salt concentration provides uniform lithium ion distribution and dense lithium plating, and the anode additives stabilize the SEI layer by forming a uniform and dense interface layer, among other functions. The polymer electrolyte lamination layer provides for operation of a lithium metal battery with an external pressure of 20 psi or less while achieving greater than 90% density of plated lithium, reducing or eliminating dendrite growth and fluffy lithium deposition.

The crosslinked polymer backbone is a cross-linked polymer having a molecular weight of between 400,000 g/mol and 900,000 g/mol. The cross-linked polymer can be a crosslinked poly(vinylidene fluoride)☐co☐hexafluoropropylene (PVDF-HFP), a crosslinked polyethylene glycol dimethacrylate (PEGDMA), cross-linked polydiallyldimethylammonium bis(fluorosulfonyl) imide (polyDDA FSI), crosslinked polyvinyl butyral (PVB), crosslinked poly(urethane acrylate) (PUA), crosslinked polyethylene glycol (PEO), crosslinked polyacrylonitrile (PAN), crosslinked poly(methyl methacrylate) (PMMA), or a copolymer thereof. The crosslinked polymer backbone may be a polyelectrolyte, a polymeric salt that has a cationic or an anionic backbone, such as lithiated Nafion®, a sulfonated tetrafluoroethylene based fluoropolymer-copolymer, and poly(lithium styrene sulfonate). The crosslinked polymer backbone can be one polymer or can be a mixture of more than one polymer. The crosslinking can be achieved by both chemical crosslinking (during synthesis) and physical crosslinking (such as the dissociated lithium salt coordination with the polymer's fluorine atoms).

The plasticizer may be an ionic liquid, such as cation-imidazolium, pyridinium, pyrrolidinium, phosphonium, anion-FSI, and bis(trifluoromethane)sulfonimide (TFSI) or a combination thereof. The plasticizer may be a low-molar-mass organic, such as polyethylene glycol (PEG)-200, PEG-400, PEG-600, succinonitrile (SN), and glutaronitrile (GN) or a combination thereof. The plasticizer may be an organic solvent, such as dimethoxyethane (DME), ethyl methyl carbonate (EMC), DMC, ethylene carbonate (EC), propylene carbonate (PC), and dimethylacetamide (DMAc) or a combination thereof. The plasticizer may be a mixture of one or more ionic liquid, low-molar-mass organic, and organic solvent. The plasticizer is present in the polymer electrolyte lamination layer in amounts from 10 wt % to 50 wt %.

The lithium salt can be one or a combination of more than one of LiFSI, lithium bis(trifluoromethanesulfonyl)imide (LiTFSI), LiBOB, lithium hexafluorophosphate ($LiPF_6$), lithium tetrafluoroborate ($LiBF_4$), and lithium perchlorate ($LiClO_4$), as non-limiting examples. As a non-limiting example, a dual salt system can be used, such as LiFSI—LiBOB. The lithium salt concentration can be 3 M or greater, and in some embodiments 3.8 M or greater, and in some embodiments 4 M or greater. The lithium salt concentration of the polymer electrolyte lamination layer can be equal to or greater than the lithium salt concentration of the liquid electrolyte used in the electrochemical cell. This level of lithium salt concentration eliminates the mass exchange with the liquid electrolyte.

The anode additive can be one or more of LiBOB, lithium fluoride (LiF), lithium nitrate ($LiNO_3$), lithium difluoro (oxalato)borate (LiDFOB), $LiBF_4$, lithium 2-trifluoromethyl-4,5-dicyanoimidazolide (LiTDI), vinyl chloride (VC), fluoroethylene carbonate (FEC), vinyl ethylene carbonate (VEC), GN, SN, polystyrene (PS), 3-(phenylsulfonyl)propionitrile (PSPN), hexane tricarbonitrile (HTCN), aluminum iodide ($AlI_3$), aluminum bis(trifluoromethanesulfonyl)imide ($Al(TFSI)_3$), and inorganic particles, such as silicon dioxide ($SiO_2$), titanium dioxide ($TiO_2$), aluminum oxide ($Al_2O_3$), aluminum hydroxide oxide ($\gamma$-AlO(OH)), and boron nitride (BN). Anode additives can be added up to about 15 wt % of the total weight of the polymer electrolyte lamination layer.

The polymer electrolyte lamination layer may comprise more than one distinct sublayers. The distinct sublayers can vary in one or more of the crosslinked polymers and any one or more of the functional components.

The polymer electrolyte lamination layer is coated onto the lithium alloy anode cap or the separator with assistance of a casting solvent, which will be evaporated during the drying process. The casting solvent can be DMAc, dimethylformamide (DMF), N-methyl-2-pyrrolidone (NMP), tetramethylurea (TMU), N,N-diethylacetamide (DEAc), triethyl phosphate (TEP) and mixtures thereof.

The polymer electrolyte lamination layer has strong mechanical properties, with greater than 100% elongation at break and greater than 10 MPa Young's modulus. The strong mechanical properties contribute to the strong bonding provided by the polymer electrolyte lamination layer, assist in enabling the electrochemical cell to operate with low to no external pressure, and reduce swell of cycled anodes. Cycled anodes with the polymer electrolyte lamination layer disclosed herein show significantly less swell than anodes without the polymer electrolyte lamination layer. The polymer electrolyte lamination layer can be between about 0.01 µm and 10 µm in thickness, and more particularly, from about 1.0 µm to 3 µm.

The polymer electrolyte lamination layer disclosed herein is an electrolyte with bulk resistance (as a function of lithium ion conductivity) and low interface impedance to the lithium metal-containing cap and anode. The proper choice of lithium salt and anode additives in conjunction with the casting solvent enables the interfacial stability between the crosslinked polymer and lithium metal. The high lithium salt concentration allows fast and uniform lithium diffusion at the interface upon plating. The ionic conductivity of the polymer electrolyte lamination layer may be greater than $1.0 \times 10^{-5}$ S/cm, and in some embodiments is greater than $1.0 \times 10^{-4}$ S/cm. The favorable SEI formed by the high lithium salt concentration and the anode additives stabilizes the interface during cycling.

One embodiment of a polymer electrolyte lamination layer comprises a crosslinked polymer backbone of crosslinked PVDH-HFP copolymer with a molecular weight of between 400,000 g/mol and 900,000 g/mol. The molar ratio of PVDF:HFP is 15-40:1. The plasticizer is an ionic liquid, such as N-propyl-N-methylpyrrolidinium bis(fluorosulfonyl)imide (Pyr13FSI). A lithium salt, such as LiFSI, is present at a concentration of 3 M or greater and may be 3.8 M or greater or 4 M or greater. The lithium salt concentration in the polymer electrolyte lamination layer can be greater than or equal to the lithium salt concentration of the liquid electrolyte. The casting solvent is an organic solvent such as DMAc, and the anode additive is LiBOB present at a concentration of between 4 wt % and 10 wt %, inclusive.

The PVDF, with a high dielectric, is effective in dissociating the contained lithium salt thereby generating a large quantity of charge carriers for conduction. The highly depolarized CF bond forms a Lewis base complexation with the lithium ions, and thus retards the ordering to crystalline PVDF, further assisting lithium ion conduction. Using an anode additive such as LiBOB assists in SEI formation. LiBOB also enables faster drying times in the processing of the polymer electrolyte lamination layer.

One example of a polymer electrolyte lamination layer comprises 33 wt % of crosslinked PVDH-HFP copolymer, 21 wt % of Pyr13FSI as the plasticizer, 4 M concentration of LiFSI, 4 wt % of LiBOB as the anode additive, and DMAc as the casting solvent. The polymer electrolyte lamination layer has a wet peel strength of 21 N/m, a dry peeling strength of 21 N/m, and a conductivity of $1.2 \times 10^{-4}$ S/cm.

Figure 4A:
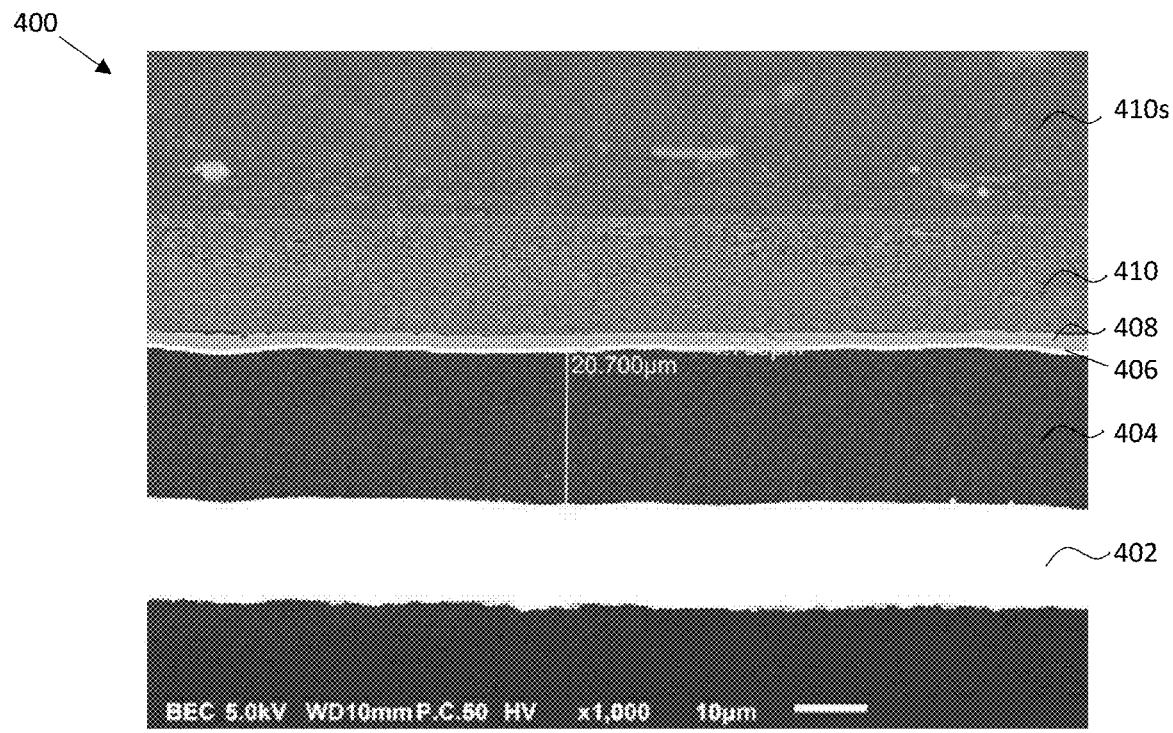
FIG. 4A is a cross-sectional image from a scanning electron microscope (SEM) of a portion of an electrochemical cell having an anode stack with a lithium metal anode, a lithium alloy anode cap and a polymer electrolyte lamination layer as disclosed herein after cycling under low external pressure.
Figure 4B:
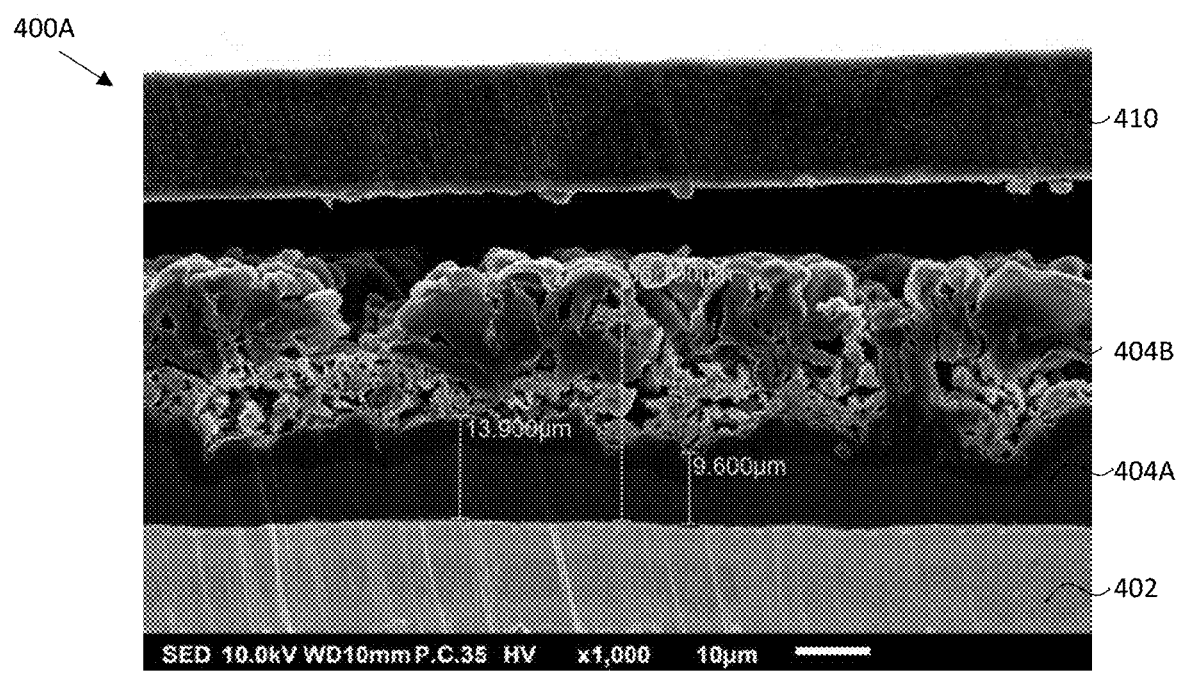
FIG. 4B is a cross-sectional SEM image of a portion of an electrochemical cell without a lithium alloy anode cap and a polymer electrolyte lamination layer as disclosed herein after cycling under low external pressure.

An electrochemical cell 400 was formed with a copper foil anode current collector 402 with 10 µm of lithium metal seed as the lithium metal anode 404, a lithium alloy anode cap 406 of about 0.7 µm LiSn, a cathode with LCO as the cathode active material, a porous polyethylene separator 410, and a carbonate liquid electrolyte with an ionic liquid. The polymer electrolyte lamination layer 408 of the example formulation bonds the separator 410 and the lithium alloy anode cap 406. The electrochemical cell was cycled, and a single charge at less than 10 psi external pressure achieved 100% density plated lithium. FIGS. 4A and 4B compare this electrochemical cell 400 with an electrochemical cell 400A without the polymer electrolyte lamination layer 408. FIG. 4A is a cross-section SEM analysis of the electrochemical cell 400 with the polymer lamination layer 408 and the lithium alloy anode cap 406 after 20 cycles at 0 psi external pressure. The cathode is not shown. FIG. 4A shows a well bonded anode stack with densely plated lithium with no external pressure applied during cycling. The plated lithium of about 11 µm and the lithium seed, together as lithium metal anode 404, are fused so well that the interface is indistinguishable. All layers remain tightly bonded throughout the cycle operation. FIG. 4B is a cross-section SEM analysis of the electrochemical cell 400A without lithium alloy anode cap after 60 cycles at 20 psi external pressure. The cathode is not shown. The cell in FIG. 4B shows that the layers are not well bonded even under 20 psi of external pressure. The separator 410, the plated lithium 404B, and the lithium seed 404A debond from each other. The surface of the separator 410s is labeled for clarity. The debonding of the separator 410 causes the plated lithium 404B to fluff to an undesirably low density, porous layer of reduced electrochemically active material with an increased thickness, lowering the energy density. As seen in FIG. 4A, the plated lithium and lithium seed has a thickness of 20.7 µm after cycling, while the plated lithium and the lithium seed in FIG. 4B has swelled to a thickness of 35.1 µm.

Electrochemical cells as described above, one with the polymer electrolyte lamination layer and lithium alloy anode cap and one without, were tested to compare swelling at varying charge rates and cycles under low external pressure. Both electrochemical cells were cycled at 20 psi external pressure. After 20 cycles, both C/7 and C/4 charge rate cells maintained 100% capacity. The cycled anodes with the polymer electrolyte lamination layer and lithium alloy anode cap showed significantly less swell than the anodes without such layers after 20 cycles at 20 psi. At the C/7 charge rate, the thickness of the anode without the polymer electrolyte lamination layer and lithium alloy anode cap was 25 µm while the thickness of the anode with the polymer electrolyte lamination layer and lithium alloy anode cap was 21 µm, which is equivalent to the theoretical thickness of 10 µm lithium seed and the 11 µm plated lithium. At the C/4 charge rate, the thickness of the anode without the polymer electrolyte lamination layer and the lithium alloy anode cap was 33 µm while the thickness of the anode with the polymer electrolyte lamination layer and the lithium alloy anode cap was 24 µm, slightly thicker than the theoretical thickness of 21 µm. Cycling at 20 psi external pressure, after 60 cycles, the anode with the polymer electrolyte lamination layer and the lithium alloy anode cap retains >99% of its initial capacity. At the C/4 charge rate, the thickness of the anode without such layers was 44 µm while the thickness of the anode with the polymer electrolyte lamination layer and the lithium alloy anode cap was 35 µm.

Figure 5:
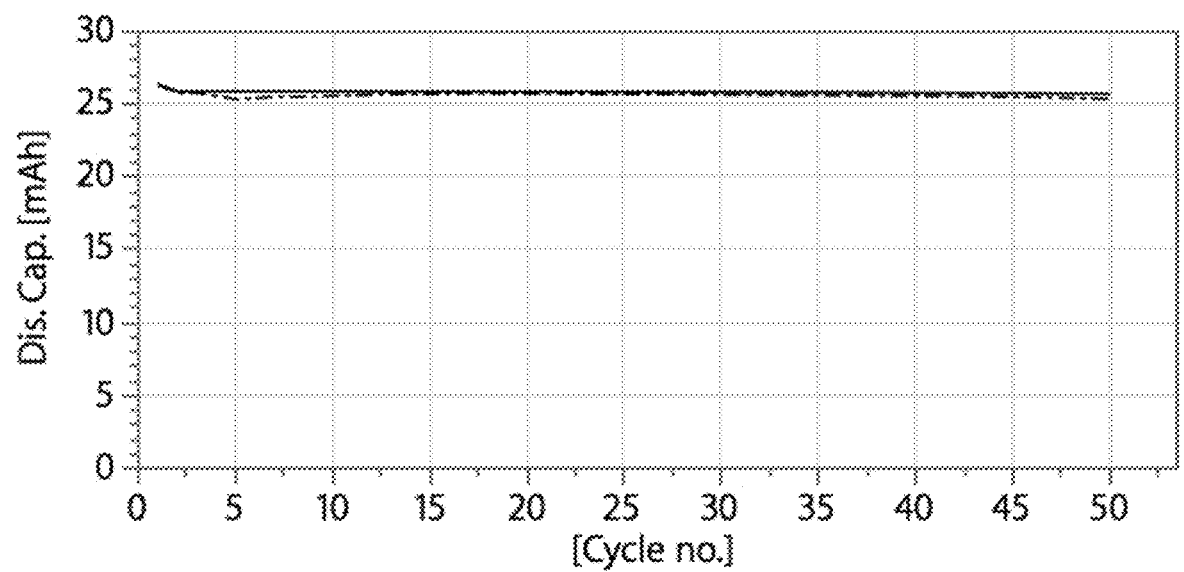
FIG. 5 is a graph of discharge capacity versus cycles for an electrochemical cell design as disclosed herein.

Another electrochemical cell was fabricated with the following materials and thicknesses: 4 µm Cu anode current collector; 10 µm lithium metal anode seed; 2 µm $Li_{22}Sn_5$ anode cap; 2 µm polymer electrolyte lamination layer composed of LiFSI salt, crosslinked PVdF-HFP polymer backbone, $Py_{13}FSI$ ionic liquid plasticizer, and LiBOB additive; 14 µm polyolefin separator; 39 µm $LiCoO_2$ cathode with binder and carbon; and 6 µm Al cathode current collector. This electrochemical cell design delivers 1050 Wh/L volumetric energy density (excluding packaging). FIG. 5 illustrates the discharge capacity for the first 50 cycles of two cells employing this design using zero external pressure. The discharge rate in cycle 1 was C/5 while all other cycles were performed at C/2.

It is to be understood that the terminology used herein is used for the purpose of describing particular embodiments only and is not intended to limit the scope of the disclosure. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Unless defined otherwise, all technical and scientific terms used herein have the same meanings as commonly understood by one of ordinary skill in the art to which this invention belongs.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An electrochemical cell, comprising:
a cathode having a cathode current collector and a cathode active material;
an anode comprising:
an anode current collector;
lithium metal on the anode current collector; and
an anode cap consisting of a lithium alloy as a layer on the lithium metal opposite the anode current collector;
a separator between the cathode active material and the anode cap;
a polymer electrolyte lamination layer bonding the anode cap to the separator, the polymer electrolyte lamination layer comprising:
a crosslinked polymer having a molecular weight of between 400,000 g/mol and 900,000 g/mol;
a first lithium salt having a concentration of 3M or greater;
a plasticizer; and
0 wt % to 15 wt % of an anode additive; and
a liquid electrolyte comprising a solvent and a second lithium salt having a concentration less than the concentration of the first lithium salt, wherein the polymer electrolyte lamination layer prevents the liquid electrolyte from contacting the anode, and
wherein the crosslinked polymer is crosslinked PVDF-HFP with a molar ratio of PVDF:HFP of 15-40:1, the plasticizer is an ionic liquid, a lithium salt concentration is greater than 3.8 M, and the anode additive is LiBOB.

2. An electrochemical cell, comprising:
a cathode having a cathode current collector and a cathode active material;
an anode comprising:
an anode current collector;
lithium metal on the anode current collector; and
an anode cap consisting of a lithium alloy as a layer on the lithium metal opposite the anode current collector, wherein the lithium alloy is $Li_{22}Sn_5$;
a separator between the cathode active material and the anode cap;
a polymer electrolyte lamination layer bonding the anode cap to the separator, the polymer electrolyte lamination layer comprising:
a crosslinked polymer having a molecular weight of between 400,000 g/mol and 900,000 g/mol;
a first lithium salt having a concentration of 3M or greater;
a plasticizer; and
0 wt % to 15 wt % of an anode additive; and
a liquid electrolyte comprising a solvent and a second lithium salt having a concentration less than the concentration of the first lithium salt, wherein the polymer electrolyte lamination layer prevents the liquid electrolyte from contacting the anode.

3. An electrochemical cell, comprising:
a cathode having a cathode current collector and a cathode active material;
an anode comprising:
an anode current collector;
lithium metal on the anode current collector; and
an anode cap consisting of a lithium alloy of lithium alloyed with one or more of Sn, Sb, Si, Au, Zn, Al and Mg as a layer on the lithium metal opposite the anode current collector;
a separator between the cathode active material and the anode cap;
a polymer electrolyte lamination layer bonding the anode cap to the separator, the polymer electrolyte lamination layer comprising:
a crosslinked polymer having a molecular weight of between 400,000 g/mol and 900,000 g/mol;
a first lithium salt having a concentration of 3M or greater;
an ionic liquid; and
0 wt % to 15 wt % of an anode additive; and
a liquid electrolyte comprising a solvent and a second lithium salt having a concentration less than the concentration of the first lithium salt,
wherein the polymer electrolyte lamination layer prevents the liquid electrolyte from contacting the anode.

4. The electrochemical cell of claim 3, wherein the crosslinked polymer is selected from the group consisting of crosslinked PVDF-HFP, crosslinked PEGDMA, crosslinked polyDDA, crosslinked PVB, crosslinked PUA, crosslinked PEO, crosslinked PAN, crosslinked PMMA, and copolymers thereof.

5. The electrochemical cell of claim 3, wherein the first lithium salt is selected from the group consisting of one or more of LiFSI, LiTFSI, LiBOB, $LiPF_6$, $LiBF_4$, and $LiClO_4$.

6. The electrochemical cell of claim 3, wherein the polymer electrolyte lamination layer provides greater than 20 N/m dry lamination strength and greater than 20 N/m wet lamination strength between the anode and the separator.

7. The electrochemical cell of claim 3, wherein the polymer electrolyte lamination layer has an ionic conductivity of greater than $1.0 \times 10^{-4}$ S/cm.

8. The electrochemical cell of claim 3, wherein the polymer electrolyte lamination layer comprising the crosslinked polymer is crosslinked PVDF-HFP with a molar ratio of PVDF:HFP of 15-40:1, a lithium salt concentration is greater than 3.8 M, and the anode additive is LiBOB.

* * * * *